Patented June 26, 1951

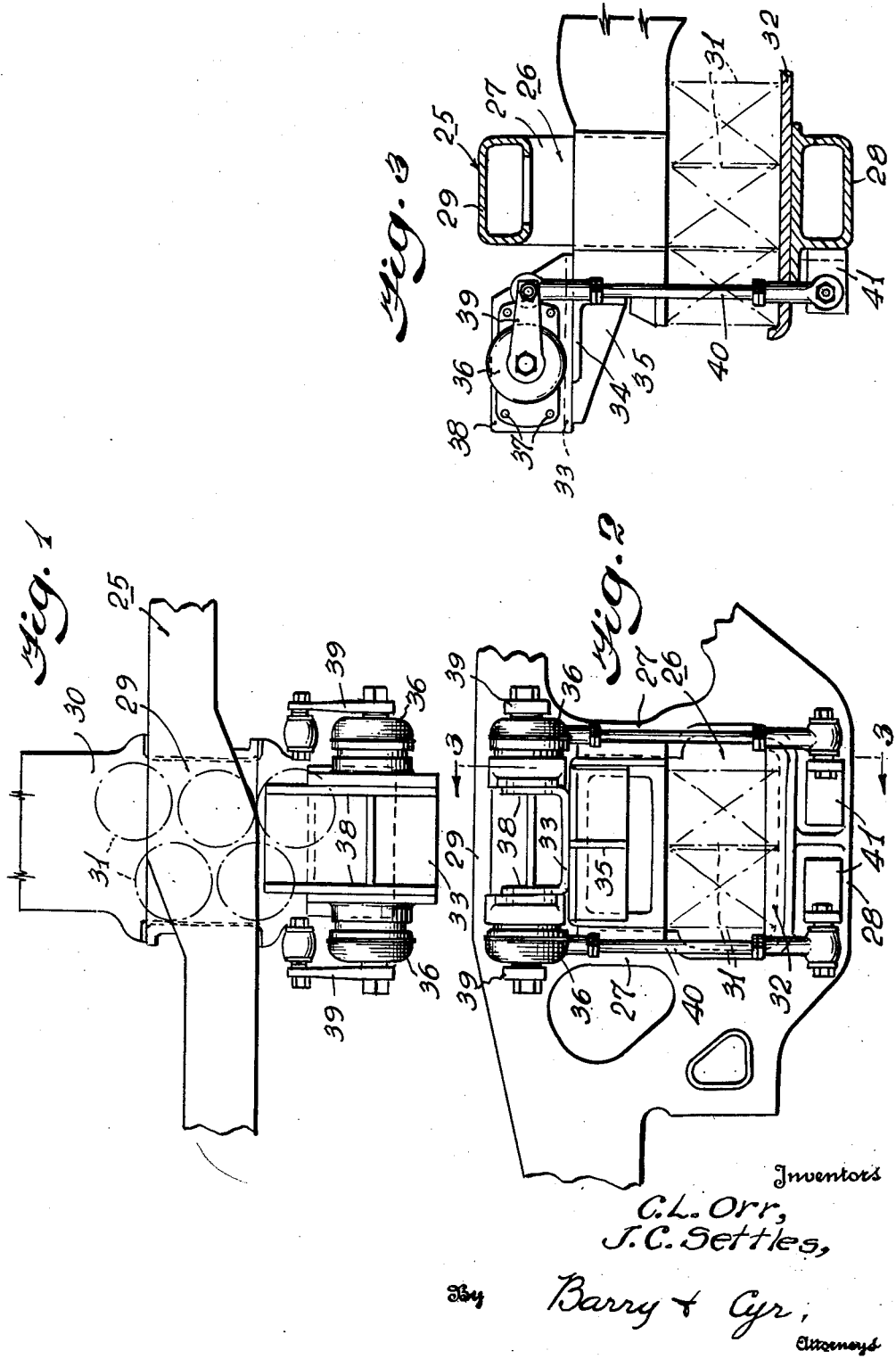

2,558,150

UNITED STATES PATENT OFFICE 2,558,150

MEANS TO FACILITATE APPLICATION OF SHOCK ABSORBERS TO RAILWAY TRUCKS

Claude L. Orr and James C. Settles, Columbus, Ohio, assignors to The Buckeye Steel Castings Company, Columbus, Ohio Application November 2, 1945, Serial No. 626,330

4 Claims. (Cl. 105—197)

1

This invention relates to improvements in railway trucks, and more particularly to improved means for use in applying shock absorbers to such trucks.

One of the objects of the invention is to supply means by which a known type of shock absorber may be interposed between a spring supported bolster and the side frame of a railway truck. The shock absorber may consist of a hollow cylindrical casing which contains rotating parts in a mass of oil or the like, an arm for actuating the rotating parts, and a link for connecting the arm to a part of a truck that is relatively movable to the part on which the cylindrical casing is mounted. The application of the shock absorber consists in mounting the cylindrical body on a sprung member, usually the bolster, and attaching the free end of the link to an unsprung member, such as the side frame. Relative movement between sprung and unsprung truck parts, due to compression or release of the springs, causes the internal parts of the casing to rotate. The hydraulic fluid contained in the casing is forced through openings or ports in the rotating parts thereby dissipating some of the elastic energy of the spring.

With the foregoing object outlined and with other objects in view which will appear as the description proceeds, the invention consists in the novel features hereinafter described in detail, illustrated in the accompanying drawings, and more particularly pointed out in the appended claims.

In the drawings:

Fig. 1 is a top plan view of a portion of a truck side frame and bolster with one form of the invention applied thereto.

Fig. 2 is a side elevation of the same.

Fig. 3 is a transverse vertical sectional view taken on the line 3—3 of Fig. 2.

Although the drawings show side frames, bolsters, spring seat brake hanger brackets, and spring details characteristic of a known type of 6-wheel trucks, it will be appreciated that our improvements can also be incorporated in trucks having a greater or less number of wheels.

Referring to Figs. 1 to 3, inclusive, which show the application of two shock absorbers to each bolster end (only one bolster end being illustrated), the truck includes a side frame 25 having a bolster opening 26 formed by column members 27, spring seat member 28 and top member 29. The end of a bolster 30 is supported in the bolster opening by means of coil springs 31 which rest at their lower ends on a spring seat brake hanger bracket 32, which in turn, is supported by the spring seat member 28 of the side frame. In accordance with the present invention, a U-shaped bracket 33 is secured to the top of the bolster end by welding or other means, not shown. A portion of the bracket overhangs the bolster end and is supported by an angle bracket 34 secured to the end of the bolster, and both brackets 33 and 34 are reinforced by a centrally disposed vertical rib 35 arranged beneath the U-shaped bracket. All connections between the brackets, rib and bolster may be made by welding or the like.

A hydraulic shock absorber cylinder 36 is mounted by bolts or the like, which may be passed through holes 37 in the base of the cylinder and in the upstanding arms 38 of the U-shaped bracket. Each shock absorber has an inwardly projecting arm or actuating element 39 rigidly secured at one end to the internal rotating parts (not shown) of the shock absorber and pivotally connected at its other end to the upper end of a vertical link 40. The lower end of each link is pivotally connected to a bracket 41 secured by any suitable means to the spring seat member of the side frame.

It will be noted that the inner end of the bracket 33 which overlies the top of the bolster is outside of the vertical plane of the outer face of the top member 29 to provide clearance under the bolster for application or removal of springs 31 or shims (not shown). The widths of the brackets 33 and 34 are less than the width of the bolster opening 26 so that the bolster end may be inserted in, or removed from, the bolster opening with the brackets applied, provided the shock absorbers are not bolted to the brackets at such a time.

From the foregoing, it is evident that relative vertical movement between the bolster and side frame, due to spring action, will cause the arms 39 of the shock absorbers to oscillate, thereby actuating the internal rotatable parts of the shock absorbers.

From the foregoing, it is believed that the constructions, operation and advantages of the invention will be readily understood, and we are aware that changes may be made in the details disclosed without departing from the spirit of the invention, as expressed in the following claims:

What we claim and desire to secure by Letters Patent is:

1. Apparatus for damping vertical oscillations of the bolster of a railway car truck comprising, a side frame including a compression member and a tension member, spaced guide columns joining the tension member and the compression member defining sides of a bolster opening in the side frame, a bolster having an end portion extending through said bolster opening and springs resiliently supporting the end portion of the bolster on said tension member for vertical movements guided by said guide columns, a bracket carried by the end portion of the bolster with an inboard end thereof positioned outboard of a vertical plane defined by the outboard face of the compression member, an upstanding arm carried by the bracket lying between vertical planes defined by the sides of the bolster, a shock absorber having a base secured to said arm, an actuating arm projecting from the shock absorber towards the side frame, a link pivotally connected to said actuating arm extending downwardly along one guide column so as to avoid obstruction of the bolster opening, and means pivotally securing the lower end of said link to the tension member.

2. In apparatus for damping vertical movements of the bolster of a railway car truck, a side frame including a compression member and a tension member, spaced guide columns joining the tension member and the compression member defining sides of a bolster opening in the side frame, a bolster having an end portion extending into said bolster opening and arranged for vertical guided movements between said guide columns, springs supporting the end portion of the bolster on said tension member, a U-shaped bracket carried by the upper surface of the bolster end portion with an inboard end of the bracket arranged outboard of the compression member, upstanding arms carried by said U-shaped bracket with said arms lying within the transverse dimensions of the bolster, a shock absorber having a flange shaped base secured to one arm of said bracket, an actuating arm projecting from the shock absorber inwardly towards the side frame, a link pivotally secured to said actuating arm extending downwardly along one side of the bolster end portion and along one guide column without obstructing the bolster opening, means pivotally connecting the lower end of said link to said tension member, a second shock absorber having a flanged shaped base secured to the other arm of the U-shaped bracket, an actuating arm projecting from the second shock absorber inwardly towards the side frame, a link pivotally connected to the second actuating arm extending downwardly along the other side of the bolster and along the other guide column without obstructing the bolster opening, and means pivotally securing the lower end of the second link to said tension member.

3. In apparatus for damping vertical oscillations of the bolster of a railway car truck, a side frame including a compression member and a tension member, spaced guide columns joining the tension member and the compression member defining sides of a bolster opening in the side frame, a bolster having an end portion extending through said bolster opening, springs supporting the end portion of the bolster on said tension member, said bolster end portion being guided during vertical movements by said guide columns, a bracket carried by the end portion of the bolster with an inboard end of the bracket positioned outboard of the compression member, an upstanding arm at each end of the bracket lying between vertical planes defined by the sides of the bolster, a shock absorber secured to one arm, an actuating arm projecting from the shock absorber towards the side frame, a link pivotally connected to said actuating arm extending downwardly along one guide column and laterally of said springs so as to avoid obstruction of the bolster opening, means pivotally securing the lower end of said link to the tension member, a second shock absorber secured to the other arm of said bracket, an actuating arm projecting from the second shock absorber towards the side frame, a link pivotally connected to the second actuating arm and extending downwardly along the other guide column and laterally of said springs so as to avoid obstruction of the bolster opening, and means pivotally securing the lower end of the second link to the tension member.

4. In apparatus for damping vertical movements of the bolster of a railway car truck, a side frame including a compression member and a tension member, spaced guide columns joining the tension member and the compression member defining sides of a bolster opening in the side frame, a bolster having an end portion extending into said bolster opening arranged for guided vertical movements between said guide columns, springs supporting the end portion of the bolster on said tension member, a bracket carried by the upper surface of the bolster end portion with an inboard end of the bracket arranged outboard of the compression member, an upstanding arm on said bracket lying within the transverse dimensions of the bolster, a shock absorber having a flange shaped base secured to said arm, an actuating arm projecting from the shock absorber inwardly towards the side frame, a link pivotally secured to said actuating arm extending downwardly along one side of the bolster end portion and along one guide column without obstructing the bolster opening, means pivotally connecting the lower end of said link to said tension member, and a reinforcing member joining the bracket and the end portion of the bolster.

CLAUDE L. ORR.
JAMES C. SETTLES.

REFERENCES CITED

The following references are of record in the file of this patent:

UNITED STATES PATENTS

| Number | Name | Date |
|---|---|---|
| 912,121 | Hagberg | Feb. 9, 1909 |
| 1,916,083 | Somervell | June 27, 1933 |
| 2,264,702 | Latshaw | Dec. 2, 1941 |
| 2,274,484 | Janeway | Feb. 24, 1942 |
| 2,330,912 | Pflager | Oct. 5, 1943 |
| 2,371,621 | Harwick | Mar. 20, 1945 |
| 2,434,287 | Pflager | Jan. 13, 1948 |